Nov. 11, 1952   P. KLEIN   2,617,200
LENS MARKING DEVICE
Filed Oct. 9, 1948   2 SHEETS—SHEET 1

INVENTOR.
PAUL KLEIN
BY George B White
ATTORNEY

INVENTOR.
PAUL KLEIN
BY George B White
ATTORNEY

Patented Nov. 11, 1952

2,617,200

UNITED STATES PATENT OFFICE 2,617,200

LENS MARKING DEVICE

Paul Klein, Stockton, Calif.

Application October 9, 1948, Serial No. 53,661

6 Claims. (Cl. 33—174)

This invention relates to a lens marking device and particularly to a device for marking the decenter or offset mechanical center in relation to the optical center of the lens.

In the preparation of lens for eyeglasses and the like, the contour of the lens is so cut, on a so-called edger, that the cylinder axis of the lens is in a prescribed relation to the eye. This relation is determined by a prescription for the correction of sight and is termed a decenter, namely the relative offset between the optical center of the lens and the mechanical center which latter determines the position of the lens in the eyeglass frame with respect to the eye of the user. The step to accomplish such decenter involves the marking of the cylinder axis ground in the lens, usually by dotting on a so-called lensometer or special protractor; then the measuring and marking of the decenter, or offset of the mechanical center from said cylinder axis; and finally the edging, or cutting the contour of the lens for the eyeglass frame around said mechanical center, usually performed in a so-called edger. The second step, namely the marking of the decenter has been performed in the past by visual observation and determination, which was of doubtful accuracy, and a comparatively tedious procedure.

An object of my invention is to provide a device whereby the prescribed decenter can be accurately and quickly marked on a lens.

Another object of the invention is to provide a device on which the lens can be quickly located offset with respect to markings or a graduated scale to a prescribed degree offset, and then suitable marks can be applied to the lens to indicate the offset mechanical center for the contour cutting or edging operation.

Another object of the invention is to coordinate a marked surface, adapted to support the lens, with guides and a marker device to accomplish accurate and uniform marking of decenter, and wherein the marker fluid for such marking is safely contained and applied to the marker after each use, and which can selectively mark a mark across the entire lens or a partial or broken line across the lens.

I am aware that some changes may be made in the general arrangements and combinations of the several devices and parts, as well as in the details of the construction thereof without departing from the scope of the present invention as set forth in the following specification, and as defined in the following claims; hence I intend to claim equivalent arrangements and combinations of the said device and parts as described in the said specification within the scope of said claims.

With the foregoing and other objects in view, which will be made manifest in the following detailed description, reference is had to the accompanying drawings for the illustrative embodiment of the invention, wherein.

Figure 1:
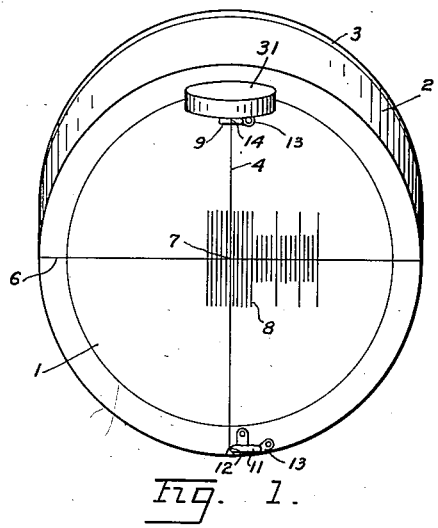
Fig. 1 is a plan view of the marking device.

In the illustrative embodiment of my invention, I make use of a convex lens supporting surface 1 forming the top of a closed box frame 2, supported on a base 3. In this form the lens supporting surface 1 is inclined with respect to the base 3 to facilitate observation and marking of lens. The convexity of the surface 1 conforms generally to the curvature of the concave side of a lens so that a lens may be easily located thereon and the measurements may be more accurate.

On the lens supporting surface are a pair of markings, represented by diametrical lines 4 and 6 at right angles to one another and intersecting preferably at the center 7 of the convex surface 1. On the horizontal line 6 are a series of scale lines or graduations 8, arranged on both sides of the center 7. The graduations are of suitable length to facilitate measurement and observation within the usual range of offsets for lens. The marking lines 4 and 6 follow the curvature of the convex surface 1.

At the top and bottom of the vertical marking line 4 are guide posts 9 and 11 respectively. The base 12 of each guide post 9 and 11 is along the vertical marking line 4 so that it aligns a marking element, laid alongside said base 12, in superimposed registry with said vertical marking line 4. The guide posts 9 and 11 are secured to the surface 1, near the periphery of the latter, by suitably attached base flanges 13. The top guide post 9 is forked at its top end and is so bent that the inner apex 14 of its fork is in vertical alignment with the vertical marking line 4 and is spaced above the latter. The edge of the top guide post 9 below said forked top end is straight and at right angles to the vertical marking line 4. The lower guide post 11 is formed with a straight edge 16 also aligned with said vertical marking line 4.

The marking on the lens is accomplished by a marker cord 17 of suitable material to carry a marker fluid, yet be strong and durable. In the herein illustration the cord 17 is made of a plastic material such as nylon, capable of being coated with ink or a dye or other marker fluid, which makes a line mark on the lens when the cord 17 is pressed upon the lens. The cord 17 is slidable through a hole 18 at the top of the surface 1 adjacent the top guide 9. The hole 18 has a V-shaped notch 19 pointing to the end of the vertical marking line 4. Another V-shaped notch 21 pointing to the lower end of the vertical marking line 4 is formed in the surface periphery adjacent the base of the other guide 11. Thus when the cord 17 is held against the bases 12 of the guides 9 and 11, or in the fork apex 14 in the top of the upper guide 9 and against the base 12 of the lower guide 11, it truly registers with the vertical marking line 4, and deposits the fluid on the lens accurately opposite said line 4.

Figure 2:
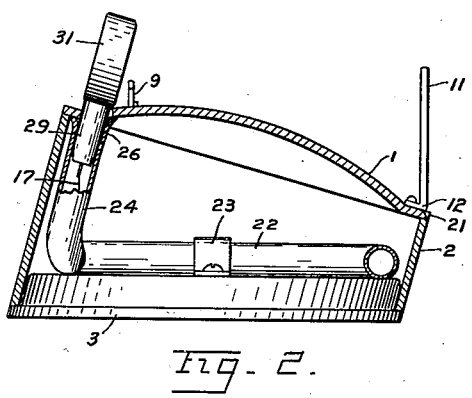
Fig. 2 is a substantially cross sectional view of the device.
Figure 5:
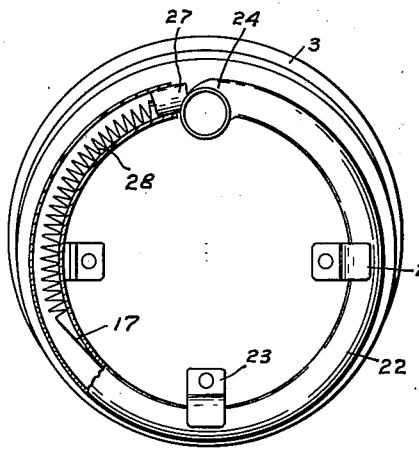
Fig. 5 is a sectional plan view of the device.

A resiliently yieldable device is provided for dipping the cord 17 into a suitable marker fluid. In the form shown in Figures 2 and 5, a glass tube 22 is the ink container and it is held on the base 3 of the box frame 2 by suitable clamps 23, and has its outlet end 24 extended upwardly to the hole 18. The open mouth 26 of the tube end 24 is flared outwardly to facilitate the plugging thereof. The inner end of the tube 22 is closed by a plug 27, to which is secured an end of a coil spring 28, which latter tapers toward its other end, secured to the cord 17. The free end of the cord 17 has on it a stopper 29 which fits into the mouth 26 of the tube end 24 to limit the inward movement of the cord and to plug the tube mouth 26. The stopper 29 is formed into a handle knob 31, whereby it may be firmly gripped by the user for the manipulation of the cord 17. Whenever the spring 28 pulls the cord 17 into the tube 22, the latter is dipped into the marker fluid. When the user pulls the cord 17 out of the tube and presses it on the lens, it deposits the marker fluid on the lens on a straight line forming the desired mark thereon.

Figure 6:
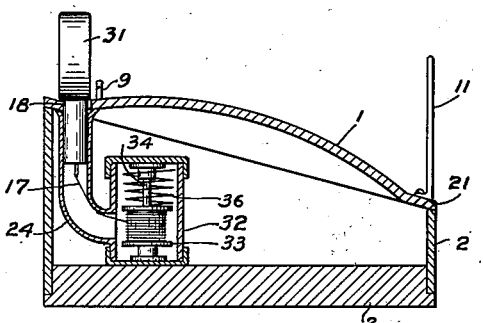
Fig. 6 is a sectional side view of a modified form of the device.

In the form shown in Fig. 6 a container in the form of a bottle 32 is suitably secured to the base 3 of the frame 2. A reel 33 in the bottle 32 is rotatable on a vertical shaft 34. A coil spring 36 around the shaft 34 has an end thereof anchored to the end of the shaft 34 and has its other end secured to the reel 33 so as to turn the reel 33 for winding the cord 17 thereon. The tube end 24 extends from a side of the bottle 32 to the hole 18 of the surface 1 as heretofore described. The device operates similarly to the first described device, except that the cord 17 is drawn into the marker fluid by the spring wound reel 33.

Figure 7:
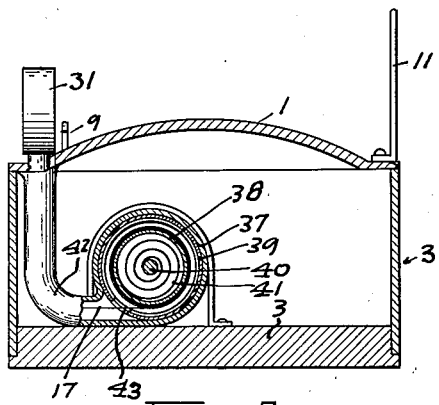
Fig. 7 is a sectional side view of another modified form of the device.

In the form shown in Fig. 7, the container or bottle 37 is secured on the base 3 horizontally in any suitable manner, and the reel 38 is in a loose housing 39 on a horizontal stub shaft 40 in said housing 39, wound by a spiral spring 41, which is anchored at one end to the reel 38 and at its inner end to the stub shaft 40. The tube 42 extends from a side of the bottle 37 near the base 3, and then upwardly, as heretofore described. The cord 17 extends through a slot 43 near the bottom of the housing 39 and then through the tube 42.

Figure 3:
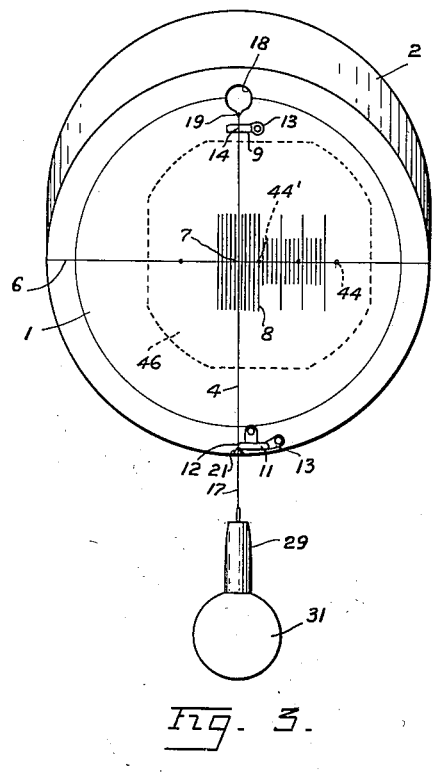
Fig. 3 is a plan view of the device in marking position.
Figure 4:
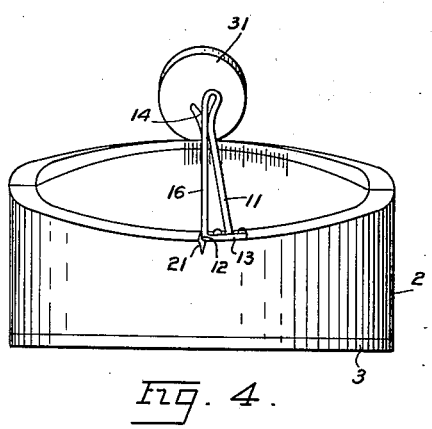
Fig. 4 is a front view of the device.
Figure 8:
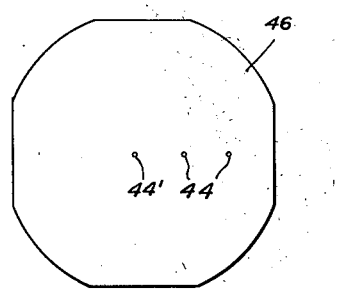
Fig. 8 is a plan view of a lens with the dot marks indicating the cylinder axis thereof.
Figure 9:
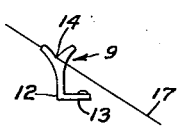
Fig. 9 is a perspective view of the forked top guide, showing the spacing of the cord from the lens at the top.

In operation, the user first applies the dot marks 44 on the lens 46, as shown in Fig. 8, which indicate the cylinder axis already ground in the lens, according to the basic prescription. The center dot 44' is the optical center of the lens. These dots can be marked on a lensometer or the like. Then the lens 46 is placed on the surface 1 with lens' concave side resting on the convex surface 1, so that the dots 44 of the cylinder axis register with the horizontal marking line 6 on the surface 1. In order to mark a decenter from the optical center "in" to the prescribed degree, the lens is shifted to the right, viewing Fig. 3, until the center dot 44' on the lens 46 is on the prescribed graduation line 8. For a decenter "out" from the optical center the lens 46 is shifted to the left, viewing Fig. 1, to the desired graduation 8 on the opposite side of the surface center 7. Then the stopper 29 is pulled out and the cord 17 is pulled into contact with the fork apex 14 of the guide 9 and along the straight edge 16 of the guide 11 and is pulled downwardly along said straight edge to the guide base 12 and against the lens 26. Then the cord 17 is lifted leaving a partial line mark on said lens spaced from the top edge and generally corresponding to the lateral decenter of the vertical center line of the lens.

The contour of the lens is determined according to the type of frame used so as to place the optical center at the correct height with respect to the eye. The prescription states the type of frame and the height is prescribed usually in terms of distance from the bottom of the lens. Accordingly the lens is turned around so that its cylinder axis dots 44 overlie the vertical marking line 4 of the convex surface 1 and the center dot 44' is over the surface center 7. Then the lens is shifted right or left from the center 7, viewing Fig. 1, to the graduation corresponding to the difference between the predetermined height and the prescribed height of the lens. Then the cord 17 is pulled out and pulled against the straight edges of both guides down to the bases 12 and to the lens 46, marking a full line on the lens from end to end, which will be the horizontal center line of the lens. Thereafter the lens can be placed in a contour cutter or edger so that the intersection of said marks is aligned with the center, and the horizontal center line aligns with the horizontal center line of the edger, and the lens is clamped in said aligned position and is cut at its edges to the desired shape around said mechanical center formed by the intersecting marks, thus accurately locating the optical center of the lens in its frame.

The device is simple to operate. It can be easily refilled through the hole 18 and the tube mouth 26. The stopper 29 effectively prevents the spilling of the marking fluid. The cord 17 is always returned into the fluid and held there by the spring. The device is portable, it is easily observable, eliminates guess-work, and results in quick accurate determination of decenter of lens.

I claim:

1. A lens marker of the character described, comprising a protractor surface for supporting a lens, a pair of diametrically opposite guide elements at the periphery of said surface, a graduated scale on the protractor surface at right angles to the diameter on which said guide elements are located, and a marking device engageable with said guide elements to mark a line across the lens between said guides according to the location of said lens relatively to said scale, said marking device including a line adapted to be coated with a marking fluid, a tube adjacent said surface for guiding said line, said tube containing marker fluid to coat said line in the tube, and means to normally pull said line into said tube.

2. A lens marker of the character described, comprising a protractor surface for supporting a lens, a pair of diametrically opposite guide elements at the periphery of said surface, a graduated scale on the protractor surface at right angles to the diameter on which said guide elements are located, and a marking device engageable with said guide elements to mark a line across the lens between said guides according to the location of said lens relatively to said scale, said marking device including a line adapted to be coated with a marking fluid, a tube adjacent said surface for guiding said line, said tube containing marker fluid to coat said line in the tube, and means to normally pull said line into said tube, and a stopper handle on the outer end of the line for handling said line and for plugging the end of the tube when said line is concealed within the tube.

3. A lens marker of the character described, comprising a protractor surface for supporting a lens, a pair of diametrically opposite guide elements at the periphery of said surface, a graduated scale on the protractor surface at right angles to the diameter on which said guide elements are located, and a marking device engageable with said guide elements to mark a line across the lens between said guides according to the location of said lens relatively to said scale, said marking device including a line adapted to be coated with a marking fluid, a tube adjacent said surface for guiding said line, said tube containing marker fluid to coat said line in the tube, and means to normally pull said line into said tube, and a stopper handle on the outer end of the line for handling said line and for plugging the end of the tube when said line is concealed within the tube, the guide nearer to said tube being adapted to hold said line raised from said surface thereat.

4. A lens marker of the character described, comprising a protractor surface for supporting a lens, a pair of diametrically opposite guide elements at the periphery of said surface, a graduated scale on the protractor surface at right angles to the diameter on which said guide elements are located, and a marking device engageable with said guide elements to mark a line across the lens between said guides according to the location of said lens relatively to said scale, said marking device including a line adapted to be coated with a marking fluid, a tube adjacent said surface for guiding said line, said tube containing marker fluid to coat said line in the tube, means to normally pull said line into said tube, and a stopper handle on the outer end of the line for handling said line and for plugging the end of the tube when said line is concealed within the tube, the guide nearer to said tube being adapted to hold said line raised from said surface thereat, said protractor surface being convex to generally fit into the concave side of a lens.

5. A lens marker of the character described, comprising a protractor surface for supporting a lens, a pair of diametrically opposite guide elements at the periphery of said surface, a graduated scale on the protractor surface at right angles to the diameter on which said guide elements are located, a frame to support said surface, a container containing marker fluid on said frame, a marker line movable into and out of the container and over said protractor surface and being adapted to be coated by said marker fluid, a yieldable device for anchoring said line and to normally pull said line into said marker fluid and away from said surface, and a stop on the line to limit the moving of the line into said fluid and forming a handle for manipulating the line.

6. In a lens marker of the character described, a frame, an inclined convex marking surface on the frame to accommodate a lens thereon, a pair of intersecting markings at right angles to one another on said surface, opposite guide elements at spaced points of one of said markings, graduated scale along the other marking, a marker line adapted to be laid along said guide elements and aligned with said first marking, and means to supply said marker line with a marker material to produce an indication mark on the lens according to the lens position relative to said pair of markings, a tubular container on the frame containing a marker fluid for coating said line, a resiliently yieldable device normally to pull said line into said tube and fluid, and a stopper handle on the line to limit the movement of the line into said tube and to plug the open end of the tube, said open end of said tube being adjacent to one of said guide elements, and a support on said last guide element spaced above said surface and aligned with said first marking to hold said line spaced above the lines, the lower portions of said guide elements being aligned with said first marking to guide said line into superimposed alignment with said first marking.

PAUL KLEIN.

REFERENCES CITED

The following references are of record in the file of this patent:

UNITED STATES PATENTS

| Number | Name | Date |
|---|---|---|
| 997,831 | Kiso | July 11, 1911 |
| 1,838,616 | Glancy | Dec. 29, 1931 |
| 2,178,516 | Brenner | Oct. 31, 1939 |
| 2,308,710 | Nichols | Jan. 19, 1943 |
| 2,348,858 | Sheehy | May 16, 1944 |
| 2,380,756 | Henry | July 31, 1945 |
| 2,413,198 | Stewart | Dec. 24, 1946 |
| 2,518,796 | Laisne | Aug. 15, 1950 |